March 19, 1929.  C. E. DRESSLER  1,705,966
BLOOD PRESSURE INDICATOR
Filed Dec. 31, 1923   2 Sheets-Sheet 1
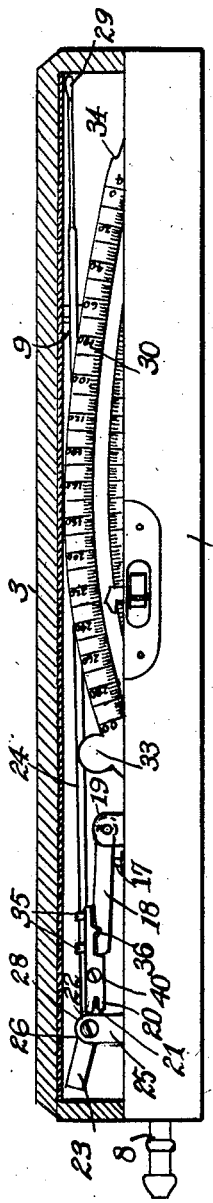
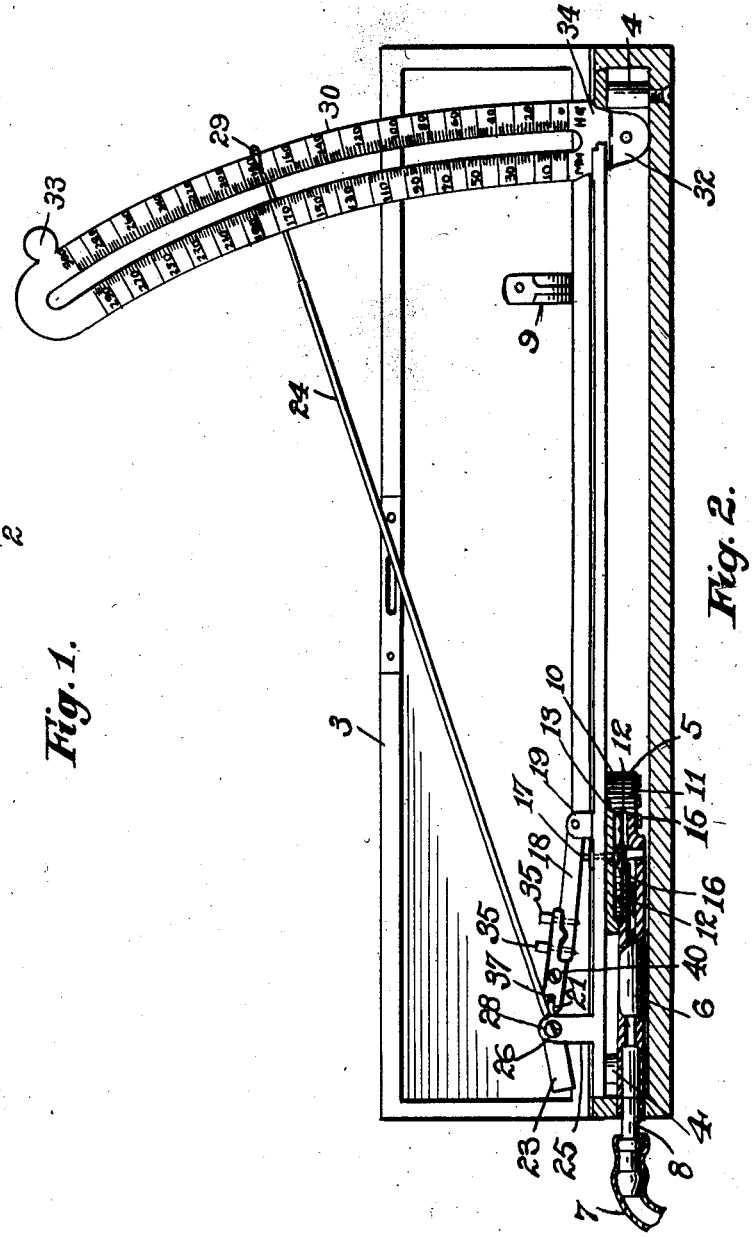
Inventor
Charles E Dressler
By his Attorney

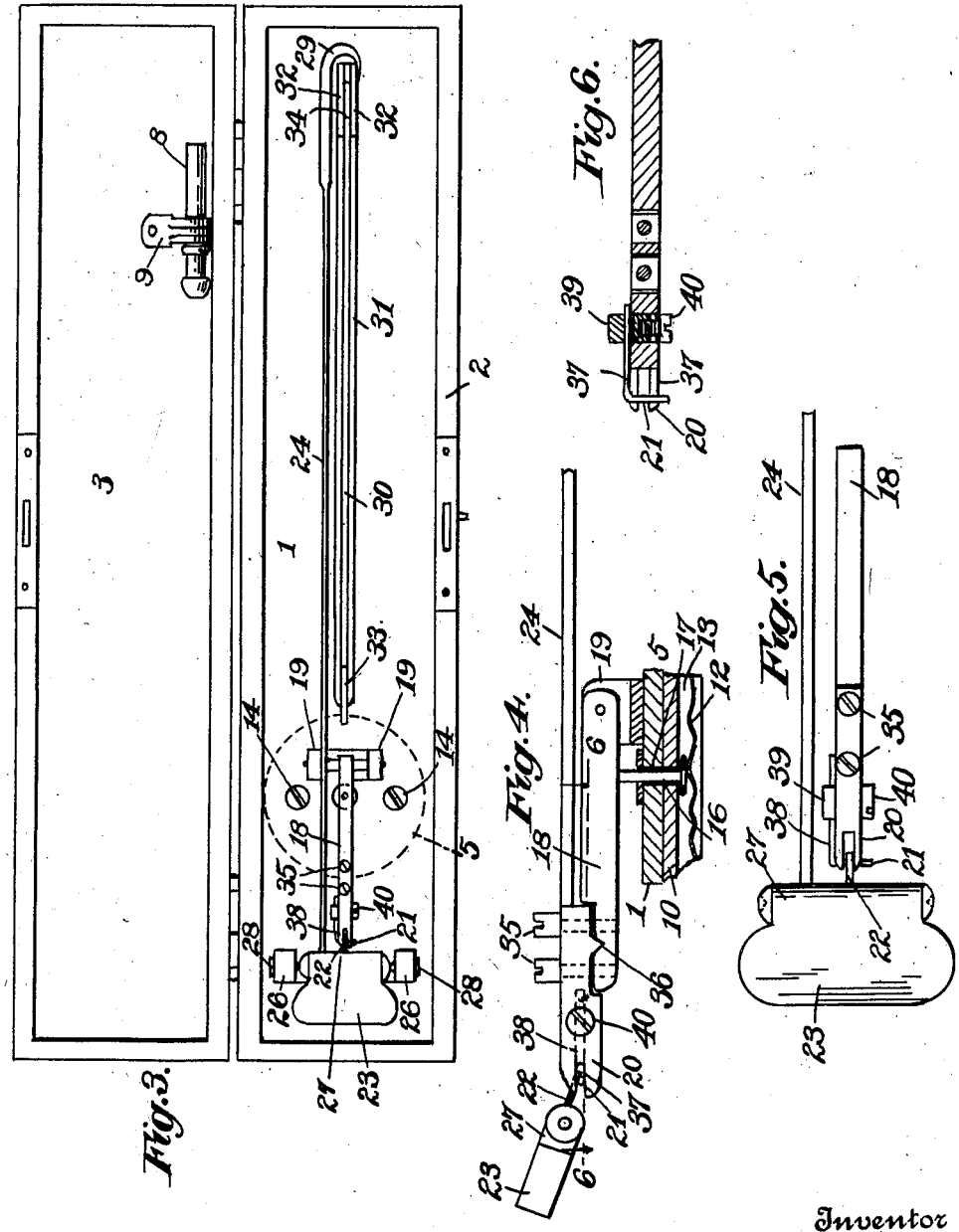

Patented Mar. 19, 1929.

1,705,966

UNITED STATES PATENT OFFICE.

CHARLES E. DRESSLER, OF NEW YORK, N. Y.

BLOOD-PRESSURE INDICATOR.

Application filed December 31, 1923. Serial No. 683,718.

The objects of this invention are to provide a blood pressure indicator in which the index hand or pointer is swung against gravity by the pressure being measured and returns to zero position by gravity; to thus avoid the use of springs, and obtain a scale with uniform spacings or markings; to obtain greater accuracy than is possible in a mercurial indicator because of the difference in caliber of the glass tubing, and also avoid the liability of breakage; to provide means for transmitting pressure to move the index hand or pointer without undue friction; to enable such pressure transmitting connections to be readily adjusted, so as to make the hand or pointer come to zero when there is no pressure; to provide a folding scale for compactness when the device is not in use, and enable it to be collapsed and folded in a case to be carried in the pocket; to provide means for locating said scale in proper position when opened for use, and means for holding the index hand or pointer against undue movement when not in use, and to obtain other advantages and results as may be brought out in the following description.

Referring to the accompanying drawing, in which like numerals of reference indicate the same parts throughout the several views, Figure 1 is a front elevation of my improved instrument showing the same in collapsed and folded condition in a case and the case closed, with the cover of the case in section to show the arrangement of the instrument therein.

Figure 2 is a view similar to Figure 1 with the cover of the case partly open and the instrument adjusted in position for use, the body portion of the case and some other parts being shown in section.

Figure 3 is a plan view of the case and showing the instrument in the collapsed condition shown in Figure 1.

Figure 4 is an enlarged detail of the means to actuate the pointer of the indicating means.

Figure 5 is a plan of the parts shown in Figure 4, and

Figure 6 is a section on the line 6—6 of Fig. 4 looking in the direction of the arrow.

In the specific embodiment of the invention shown in said drawings the operative parts are mounted on a base plate 1, which may be supported in any suitable manner, but is preferably mounted in the body portion 2 of a box or case having a cover 3, where it is held fixed in the upper part of said body portion as by posts 4. The under side of said plate 1 is provided near one end with a casing 5 having a chamber 13 with an inlet in communication with a tube 6 to which is connected the tube 7 from the arm-cuff of blood pressure testing apparatus (not shown) by a removable coupling or nipple 8, which when detached is held in the cover 3 of the case by a clip 9. The casing 5 may be of any suitable construction, and as shown comprises upper and lower connected sections 10, 11 with a diaphragm 12 clamped between them and in the chamber 13. The inlet to this chamber is below and preferably centrally of the diaphragm. The upper casing section 10 is attached to the plate 1 as by soldering or by screws 14, 14 as shown. The lower section 11 is removably connected to the upper section, as by screws 15.

A passage 16 through the plate 1 and top of the casing 5 provides a slideaway for a plunger 17, the lower end of which rests upon the diaphragm 12 and at its upper end impinges against the under side of a pressure-transmitting lever 18 extending longitudinally of the plate 1. This lever 18 is preferably of the third class fulcrumed at one end in and between bearings 19, 19 at opposite sides of the pin 17 with the lever to extend above said pin. The other end of the lever 18 is bifurcated or forked, as at 20, (Figures 3 and 5) with a pin 21 extending transversely of the bifurcation and engaging below a finger 22 projecting centrally from a counterweight 23 in which an indicating hand or pointer 24 is fixed at one end to serve as a carrier for said pointer. This counterweight 23 is delicately mounted in any suitable manner so that the hand or pointer 24 will swing in a vertical plane, and is shown as pivotally supported in a bracket 25 secured to and extending transversely of the plate 1, said bracket (Figure 3) having arms 26, 26 projecting upward therefrom and receiving between them a reduced end 27 of the counterweight 23, pivot screws 28, 28 in said arms entering sockets in the opposite edges of said reduced portion 27.

The indicating hand or pointer 24 is a light rod or bar projecting from the reduced end 27 of and in a direction opposite to the counterweight, preferably at one side of the pressure transmitting lever 18, said hand or pointer extending nearly the entire length of the base plate 1 and having a returned end 29 at the extremity to engage in front of a scale 30, the main portion of said hand or pointer lying at the rear of said scale. This scale is of arcuate form and extends upward from the base plate 1 when in use, and positioned so that the pointer extremity 29 will properly follow it. The lower end of the scale extends downward through a longitudinal slot 31 in the plate 1 and is hinged between depending ears 32, 32 with sufficient friction to hold the scale in any position to which it is adjusted. When not in use the scale is folded downward into the slot 31, as shown in Figure 1, and to facilitate its elevation the scale is provided with a finger piece 33 at its upper edge and near its free end. In order to limit this scale in its elevated or opened position, so that it will be concentric with the pivot of the index hand or pointer, a stop is provided, shown as a projection 34 arranged at the heel of the scale and adapted to engage the plate at the end of the slot 31, as shown in Figure 2.

In operation with the scale in the position shown in Figure 2, pressure entering through the tube 7 and its connections with casing 5 forces the diaphragm 12 upward and this movement is transmitted through the plunger 17 to the lever 18 so as to throw its pin 21 upward lifting the finger 22 and tilting the forward end of the hand or pointer 24 upward, the amount of tilting being read from the scale 30. When the pressure is relieved on the diaphragm the hand or pointer 24 returns by gravity, and will assume its zero position when the pressure becomes nil, it being understood that the weight of the hand or pointer overbalances the counterweight 23 sufficiently for this purpose. A suitable support is provided for the hand or pointer when in its zero position, which I have illustrated in the drawing by having the hand or pointer rest upon the top of the fulcrum for the pressure-transmitting lever 18, as shown in Figure 3.

Preferably the pressure-transmitting lever 18 has means for adjusting the end 29 of the hand or pointer 24 exactly to zero when said hand or pointer engages its stop, and I have shown for this purpose the lever 18 made in two overlapping sections held together by screws 35, 35, said overlapping portions being slightly separated except for a transverse rib 36 on one engaging the other, so that as one screw is loosened and the other tightened the angular relation of the two sections can be altered and still the lever kept rigid.

It is also preferable to have the pin 21 of the lever 18 which engages the finger 22, adjustable lengthwise of said finger, so as to adjust the leverage of the lever 18 with respect to the hand or pointer, and for this purpose I have shown said pin 21 slidable longitudinally in slots 37, 37 of the forked end 20 of the lever 18, see Figures 4 and 6, and provided at one end with an extension 38 bent to lie against the side edge of the lever 18 and adapted to be clamped in any position to which it may be adjusted. This clamping means comprises a shoe 39 slidably engaging a transverse hole in the lever, said shoe being apertured to slidably receive the extension 38 of pin 21 and having a threaded socket at its inner end to receive a screw 40 whose head abuts against the opposite side of the lever from the extension 38. Thus by tightening said screw 40 the extension 38 can be clamped against the lever 18, and by loosening said screw the extension 38 can be slid in shoe 39 to adjust the pin 21.

To prevent the index hand or pointer 24 from vibrating when the instrument is not in use, which might tend to affect its accuracy, the cover 3 of the instrument case is adapted when closed to lightly engage the extremity of the pointer 24 and its counterbalance 23, as shown in Figure 1. It will be noted that said cover 3 also holds the scale 30 in its lowered or folded position.

Having thus described my invention I claim:

1. In a blood pressure indicator, a scale, an indicating pointer normally held in zero position of the scale by its own gravity, a lever having a transverse pin free from said indicating member but adapted to abut the same, means to mount said pin to have adjustment longitudinally of the lever, and pressure actuated means to transmit movement to said lever and pointer to indicate on the scale the force exerted to move the pointer.

2. In a blood pressure indicator, an indicating member, a lever having a slotted end, a pin in the slot engaging said indicating member and having an extension at one side of the lever, means for releasably clamping said extension to the lever, and means for transmitting pressure to said lever.

3. In a blood pressure indicator, an indicating member including a pointer, a lever comprising relatively angularly adjustable connected sections, means adjustable connected to the lever to engage the indicating member, and means for transmitting pressure to said lever.

4. In a blood pressure indicator, a pointer, a lever fulcrumed at one end comprising sections relatively angularly adjustable and having an adjustable connection with the pointer, and means for transmitting pressure to said lever between its fulcrumed support and connection with the pointer.

5. In an indicator, an indicating member, an arcuate hinged scale adapted to be extended to indicate the extent of movement of said member and to be folded into substantial alinement with said member when in idle position, a stop for holding said scale in concentric relation to the indicating member when extended, and means for transmitting pressure to said indicating member.

6. In a blood pressure indicator, a pivotally supported pointer adapted to assume a horizontal position of rest by gravity, means for transmitting pressure to said pointer to move it against the force of gravity, and means for engaging said pointer to retain it in its horizontal position.

7. In a blood pressure indicator, a scale, an indicating member adapted to assume a predetermined position at one end of the scale by gravity, a counterbalance for said indicating member, means for transmitting pressure to said indicating member to move the same relative to the scale against the force of gravity, and means for engaging said indicating member and counterbalance to hold them against movement.

8. In a blood pressure indicator, a gravity-operated indicating member, a counterbalance for said indicating member, means for transmitting pressure to said indicating member, and a casing in which said parts are mounted and having a cover arranged when closed to engage said indicating member and counterbalance to restrict movement thereof.

9. In a blood pressure indicator, an indicating member, a lever having a slotted end, a pin to engage in the lever slot and having an angular extension to extend parallel of the lever at one side thereof, a shoe slidable transversely of the lever arranged to receive said pin extension, means for sliding said shoe, and means for transmitting pressure to said lever.

10. In a blood pressure indicator, an indicating member, a lever having a slotted end, a pin to engage in the slot having an angular extension to extend parallel with and at one side of the lever, a shoe slidable transversely of the lever arranged to receive said pin extension, a screw at the opposite side of the lever threaded into said shoe to draw the shoe to the lever and clamp the pin thereto, and means for transmitting pressure to said lever.

11. In a blood pressure indicator, a base plate, a gravity-operated indicating member mounted on said plate, a casing in which said base plate is mounted and having a cover to enclose the indicating member in the casing, a diaphragm box in said casing beneath the base plate having an inlet opening at one side of the diaphragm, means for transmitting pressure from the diaphragm to the indicating member, a nipple detachably connected to the inlet opening of the diaphragm casing, and means in the indicator casing to releasably support the nipple.

12. In a blood pressure indicator, an indicating pointer, a pivoted and counterweighted support for the pointer adapted to move and normally maintain the pointer in a substantially horizontal position, a scale relative to which said pointer is movable, an adjustable lever having an adjustable connection with the pivoted support of the pointer, a casing, a diaphragm in the casing arranging a chamber at one side of the diaphragm in the casing arranged for connection with a source of pressure, a pin slidably mounted in and extended through an opening in the wall of the casing at the opposite side of the diaphragm and arranged to rest upon the diaphragm and the adjustable lever to rest upon said pin, said pin being operative to transmit the movement of the diaphragm through the lever to the pivoted support of the pointer and thereby move the pointer relative to the scale proportionally to the force on the movement of the diaphragm.

13. In a blood pressure indicator, an arcuate scale having graduations reading in an upward direction, an indicating pointer to co-operate with the scale normally assuming a zero position in relation to the scale by gravity, a lever having a transverse pin free from said indicating pointer and adapted to abut the same, and means for transmitting pressure to said lever.

14. In a blood pressure indicator, a casing; an arcuate scale pivotally mounted in the casing adjacent one end adapted to extend upward from the casing in a predetermined position and to fold into the casing; a pointer pivotally mounted at one end in the casing adjacent the end opposite to that at which the scale is mounted and the free end arranged to co-operate with the scale when in position to extend upward from the casing, and adapted to normally assume a substantially horizontal position by gravity and a position in juxtaposed and parallel relation to the scale when the latter is folded into the casing; and a cover for the casing to enclose the indicator therein.

15. In a blood pressure indicator, a casing; an arcuate scale pivotally supported at one end in the casing adjacent one end thereof, said scale being adapted to be adjusted to extend upward from the casing and folded into the casing; a pointer to co-operate with said scale; a carrier in which one end of the pointer is fixed fulcrumed in the casing adjacent the end opposite to that at which the scale is supported, said carrier being arranged with a counterweight to counterbalance the pointer whereby the latter will assume a substantially horizontal position by gravity, a pressure actuated lever fulcrumed at one end in the casing and having an operative connection with the carrier for the pointer at the side from which the pointer projects; and a cover for the casing to enclose said parts therein.

16. In a blood pressure indicator, a casing; an arcuate scale pivotally supported at one end in the casing adjacent one end thereof, said scale being adapted to be adjusted to extend upward from the casing and folded into the casing; a counterbalanced pointer to cooperate with the scale having a fulcrumed support in the casing at the end opposite to that at which the scale is supported; a pressure actuated lever fulcrumed at one end in the casing and having an operative connection at the opposite end with the fulcrum support of the pointer at the side from which the pointer projects, said lever comprising angularly adjustable sections whereby to adjust the connection thereof with the fulcrum support of the pointer; and a cover for the casing to enclose said parts therein.

17. In a blood pressure indicator, a casing; an arcuate scale pivotally supported at one end in the casing adjacent one end thereof, said scale being adapted to be adjusted to extend upward from the casing and folded into the casing; a counterbalanced pointer to cooperate with the scale having a fulcrum support in the casing at the end opposite to that at which the scale is supported; a pressure actuated lever fulcrumed at one end in the casing and extending in a direction toward the fulcrumed support of the pointer; a pin projecting from the fulcrum support of the pointer in a direction toward the lever; a pin to extend transversely of and carried at the end of the lever to have adjustment in a direction toward and away from the pin of the fulcrum support of the pointer; and a cover for the casing to enclose said parts therein.

18. In a blood pressure indicator, a casing; an arcuate scale pivotally supported at one end in the casing adjacent one end thereof, said scale being adapted to be adjusted to extend upward from the casing and folded into the casing; a counterbalanced pointer to cooperate with the scale having a fulcrum support in the casing at the end opposite to that at which the scale is supported; a fulcrumed pressure actuated lever extending in a direction toward the fulcrum support of the pointer, said lever comprising sections adapted to be adjusted in angular relation to each other; a pin projecting from the fulcrum support of the pointer; a pin to extend transversely of and carried by the lever to have adjustment in a direction toward and away from the pin of the fulcrum support of the pointer; and a cover for the casing to enclose said parts therein.

19. In a blood pressure indicator, a casing; an arcuate scale pivotally supported at one end in the casing adjacent one end thereof, said scale being adapted to be adjusted to extend upward from the casing and folded into the casing; a counterbalanced pointer to cooperate with the scale having a fulcrum support in the casing at the end opposite to that at which the scale is supported; a lever fulcrumed at one end in the casing and having an operative connection at the opposite end with the fulcrum support of the pointer at the side from which the pointer projects; a diaphragm casing arranged below the lever having an inlet opening at one side of the diaphragm for a pressure actuating medium; a pin slidably mounted in said diaphragm casing at the opposite side of the diaphragm and in operative relation thereto adapted to engage the lever; and a cover for the first casing to enclose said parts therein.

20. In a blood pressure indicator, a casing; an arcuate scale adjacent one end thereof, said scale being adapted to be adjusted to extend upward from the casing and folded into the casing; a counterbalance pointer to cooperate with the scale having a fulcrum support in the casing at the end opposite to that at which the scale is supported; a lever fulcrumed at one end in the casing and having an operative connection at the opposite end with the fulcrum support of the pointer; a pressure actuated diaphragm arranged below the lever and having an operative connection therewith intermediate its ends; and a cover for the one casing to enclose the parts within the casing, said pointer and its fulcrum support being arranged for engagement by the cover when in closed position to restrict the same against movement.

Signed at New York city, in the county of New York and State of New York this 27th day of September, 1923.

CHARLES E. DRESSLER.